United States Patent [19]
Reinicke et al.

[11] Patent Number: 5,611,516
[45] Date of Patent: Mar. 18, 1997

[54] ROTARY BALL VALVE WITH RETRACTING SEAT

[75] Inventors: Robert H. Reinicke, Mission Viejo, Calif.; Joseph M. Cardin, Sparta; Arnold Dalene, Ringwood, both of N.J.

[73] Assignee: Marotta Scientific Control, Inc., Montville, N.J.

[21] Appl. No.: 411,338

[22] Filed: Mar. 27, 1995

[51] Int. Cl.$^6$ .................................................. F16K 3/22
[52] U.S. Cl. ........................ 251/77; 251/129.12; 251/159; 251/163; 251/174
[58] Field of Search ............................. 251/77, 129.12, 251/159, 162, 163, 174

[56] References Cited

U.S. PATENT DOCUMENTS

| | | | |
|---|---|---|---|
| 3,007,490 | 11/1961 | Passmore | 251/159 X |
| 3,245,653 | 4/1966 | Lavigueur | 251/159 |
| 3,404,864 | 10/1968 | Reddy | 251/174 X |
| 3,830,693 | 8/1974 | Beser et al. | 251/159 X |
| 4,676,480 | 6/1987 | Garceau et al. | 251/159 |
| 5,228,645 | 7/1993 | Reinicke | 251/77 |
| 5,247,964 | 9/1993 | DeLange | 251/159 X |
| 5,333,833 | 8/1994 | Reinicke | 251/77 |

Primary Examiner—Gerald A. Michalsky
Attorney, Agent, or Firm—Hopgood, Calimafde, Kalil & Judlowe

[57] ABSTRACT

In a preferred ball-valve construction, a valve body has spaced inlet and outlet ports on an axis of flow that is controlled by an interposed ball; the ball is rotatable about a body-fixed axis which intersects the axis of flow at the geometric center of the ball. In the closed condition of the valve, an annular valve-seat member associated with one of the ports has circumferentially sealed contact with the ball. The annular valve-seat member is guided for axial displaceability into and out of its engageability with the ball, and actuation of the valve utilized coordination of valve-seat displacement with ball rotation such that valve-seat engagement with the ball is only for the closed condition of the valve, and such that, valve-opening rotation of the ball can occur only while the annular valve-seat member is in axial-clearance relation with the ball. Various embodiments are disclosed.

7 Claims, 4 Drawing Sheets

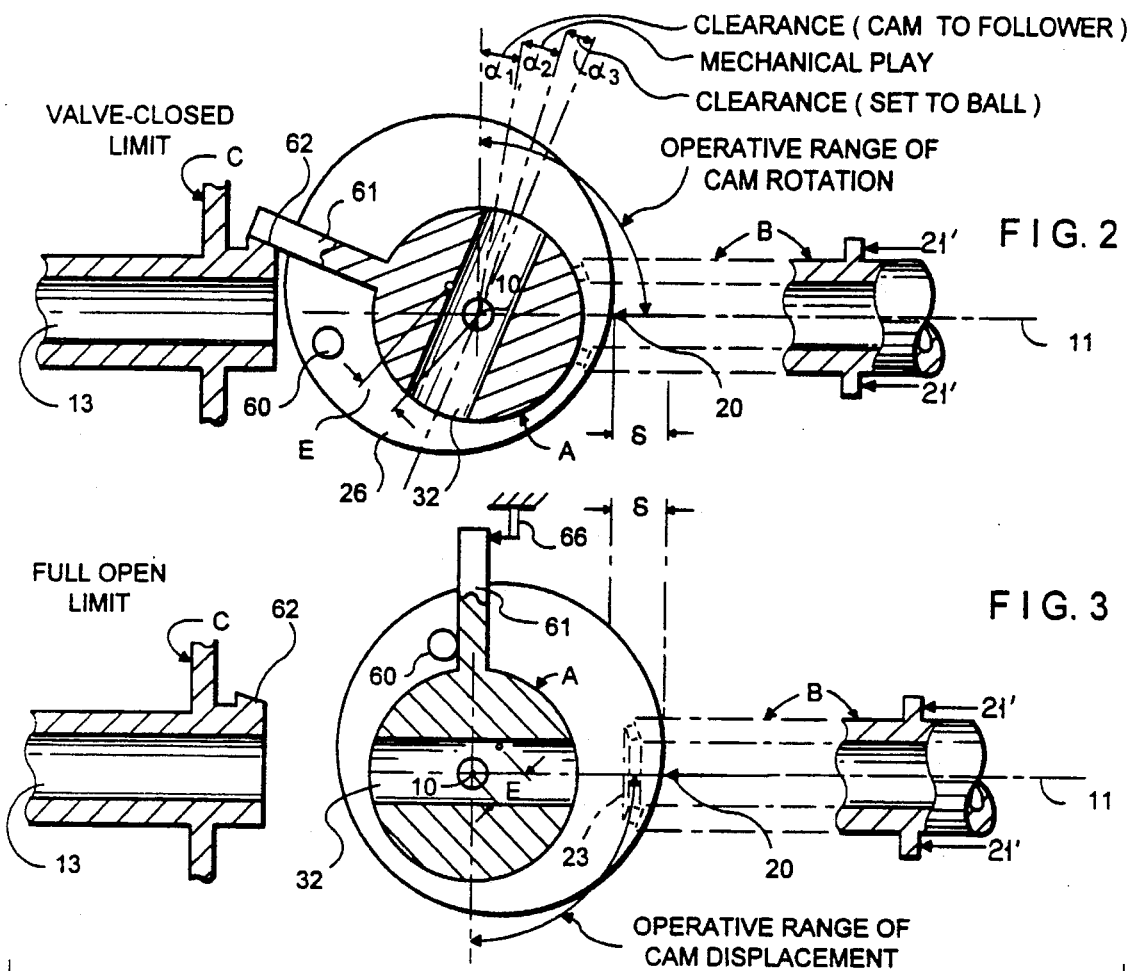
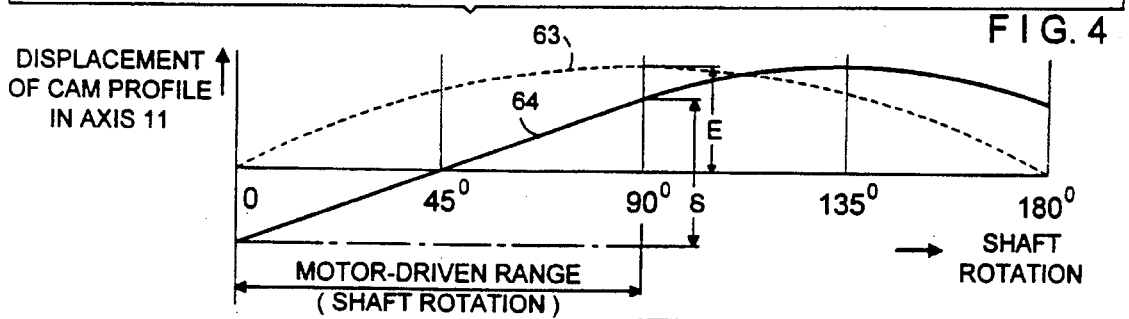
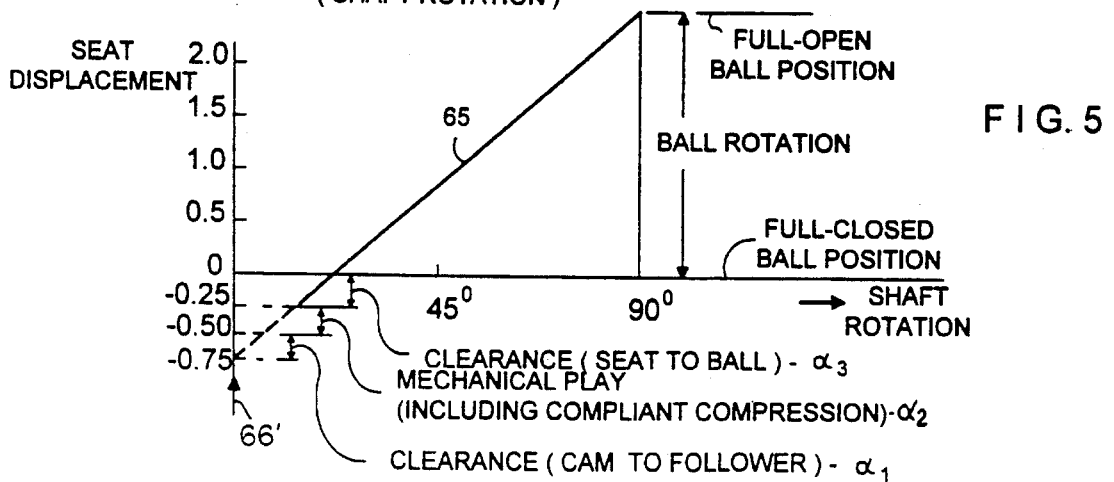

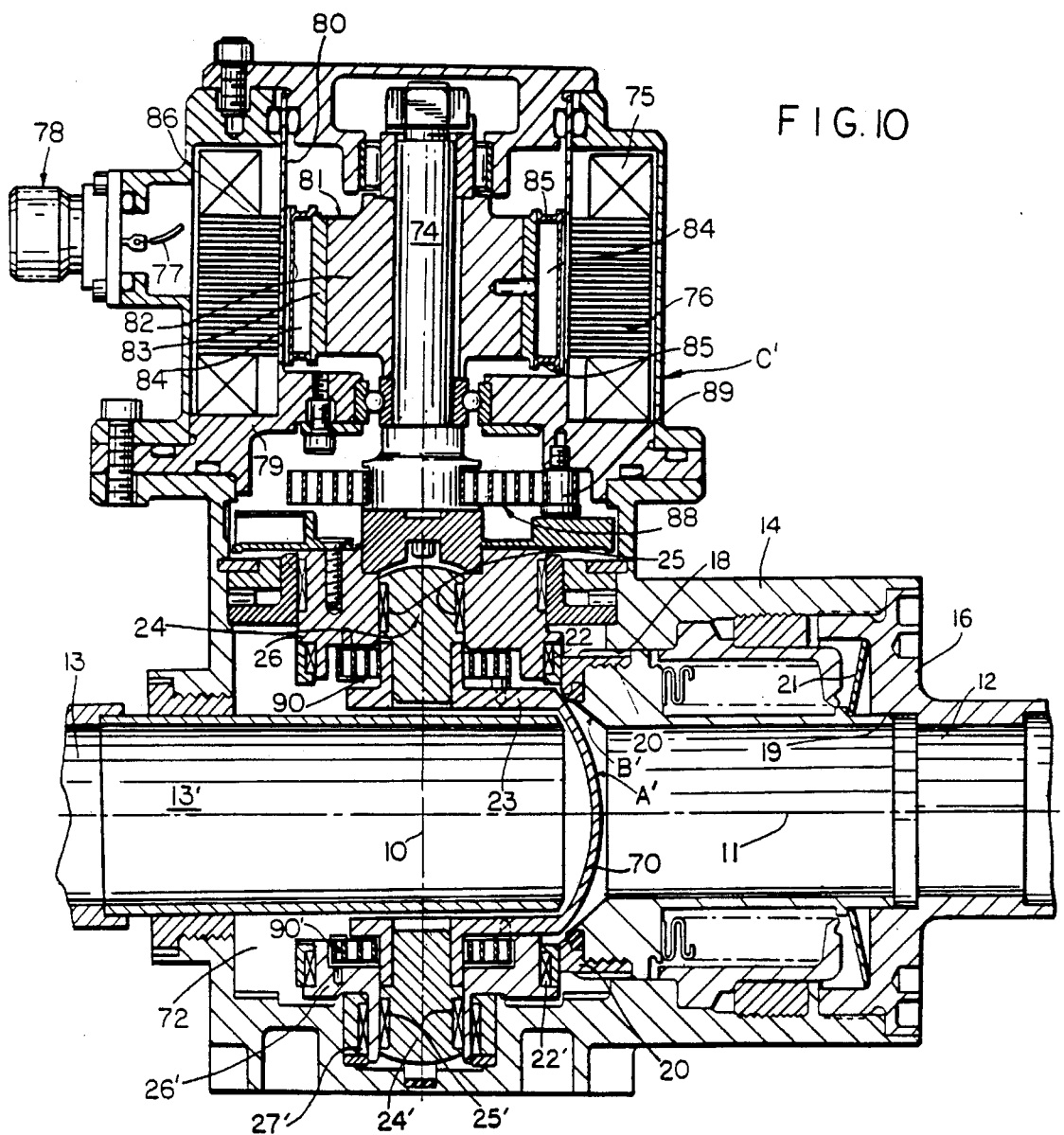

ROTARY BALL VALVE WITH RETRACTING SEAT

BACKGROUND OF THE INVENTION

The invention relates to so-called ball valves wherein a valve member which rotates to control fluid flow through the valve is characterized by a spherical surface which has sealed engagement to an annular seat for the closed condition of the valve.

The conventional valve member of a ball valve is a full sphere, except for a radial stem and a diametrically extending bore that is transverse to the stem direction. The valve-member or ball is actuable by limited rotation, e.g., 90°, about a valve-body axis of stem support, wherein said axis extends through the center of the sphere, intersecting and normal to the axis of the diametrically extending bore.

In the open condition of the valve, the diametrically extending bore aligns with cylindrical inlet and outlet ports or passages in the valve body, and an annular seal such as an elastomeric O-ring retained by one or both of these ports or passages is in peripherally continuous seated and sealing contact with the ball, encircling the adjacent end of the diametrically extending bore of the valve member. As the valve-member is actuated in the valve-closing direction, the valve-member bore and the inlet/outlet passage become progressively misaligned while the ball rotates with continuing seat engagement, thus reducing the sectional area available for inlet-to-outlet flow. When fully rotated to the valve-closed condition, a smooth spherical surface of the ball is circumferentially sealed to its seat, in total blockage of inlet-to-outlet flow.

The actuating operation of a conventional ball valve is thus characterized by the frictional resistance of the ball-to-seat engagement. For many applications, this friction can be reduced by appropriate choice of seat material and by careful attention to ball sphericity and to the accuracy of ball-stem mounting and rotation. But for other applications, as for controlled flow of cryogenic materials such as liquified oxygen, liquified hydrogen, liquified nitrogen, or other gases whether or not in liquid state, seating materials and engagements become sources of friction, wear, and leakage, to the extent that mechanical hysteresis is an on-going operational factor, and repair and maintenance expenses are relatively great.

U.S. Pat. Nos. 5,228,645 and 5,333,833 disclose ball-valve constructions wherein much of the indicated hysteresis is avoided by utilizing eccentric gyration of the rotary axis of the ball, wherein, for an initially closed condition of the valve, and in its initial phase of actuation, the throw of the eccentric is connected to retract the ball from its seat sufficiently for the ball to clear the seat, prior to a second phase of actuation involving ball rotation to open condition. To achieve this result, rotary drive of the ball has a lost-motion relation to direct drive of the eccentric. In its return stroke from full-open condition, the ball is directly driven in rotation back to a stop at which it has been oriented for its closed condition, and the final phase of eccentric rotation is operative to displace the ball center and thus the ball into contact and ensuing completely sealed engagement with the seat.

Although valves of said patents represent an important advance over prior ball-valve constructions, the fact remains that ball rotation is about an eccentrically gyrated axis, however small the eccentric throw; therefore, the final phase of valve closure is necessarily accompanied by a component of eccentric displacement, in the course of establishing sealed closure of the valve. Such constructions therefore provide a valve action which is short of a more desirable poppet action in the closing/sealing phase of valve operation.

BRIEF STATEMENT OF THE INVENTION

It is an object of the invention to provide an improved ball-valve construction of the character indicated.

It is a specific object to meet the above object with a ball-valve construction in which actuating friction and accompanying hysteresis are reduced to relative insignificance.

It is also a specific object to provide a sealable ball-valve construction which almost entirely avoids seal wear in operation of the valve (a) out of its valve-closed and sealed condition and (b) in the course of return to its valve-closed and sealed condition.

Another specific object is to meet the above objects with a construction which features poppet action in the final phase of ball engagement to its seat, for sealed closure of the valve.

Yet another specific object is to meet the above objects with a construction which is inherently suited to avoiding or very substantially reducing the repair and maintenance expense of handling controlled flows of cryogenic liquids and/or gases.

The invention achieves these objects in a ball-valve construction (a) wherein the ball surface, which in valve-closed condition must have circumferentially continuous sealed contact with its seat, is mounted for rotation about a fixed axis, and (b) wherein the seat is subjected to axial displacement, into and out of its relation of ball engagement for sealed closure of the valve. Preferably, the axis of such displacement is at all times through the center of the ball and is aligned with inlet and outlet ports of valve-housing structure. In the preferred embodiment, a rotary cam, which may be an eccentric surface, is mounted for rotation about the axis of ball rotation, and the valve seat is guided for its axial displacement pursuant to cam-follower tracking of the throw of the rotary cam or eccentric. Provision is made for lost motion in a connection from rotary drive of the cam or eccentric, to a shaft for rotation of the ball, such that, commencing with a fully closed condition of the valve, the seat is first displaced axially into clearance with the ball, before the ball is rotated, as to its full-open condition. Conversely, the fully-open valve is closed by first rotating the ball into its orientation for valve closure, before the seat is returned, for poppet-like engagement to and sealed closure of the valve. Various embodiments are disclosed.

DETAILED DESCRIPTION OF THE DRAWINGS

Preferred embodiments of the invention will be described in detail, in conjunction with the accompanying drawings, in which:

FIG. 2 is a simplified and exaggerated section taken in a plane which includes the axis of inlet-outlet flow but is normal to the plane of FIG. 1, and illustrative of a parts relationship for the fully closed condition of the valve, with the valve seat axially displaced into resiliently loaded and sealed closure of the valve;

FIG. 3 is a view similar to FIG. 2, for the full-open condition of the valve;

FIG. 4 is a graphical layout of an illustrative rotary cam profile, as a function of drive-shaft rotation, with legends to assist in description of such a cam, in operation of the valve of FIGS. 1 to 3;

FIG. 5 is another graphical layout, to the same scale of drive-shaft rotation as in FIG. 4, with legends to identify discrete events in the coordination of ball rotation with cam-driven seat-displacement, in operation of the valve of FIGS. 1 to 3;

FIG. 10 is a vertical section, in the nature of FIG. 1, for a different drive system in conjunction with valve operation pursuant to FIGS. 6 and 7.

DETAILED DESCRIPTION

Figure 1:
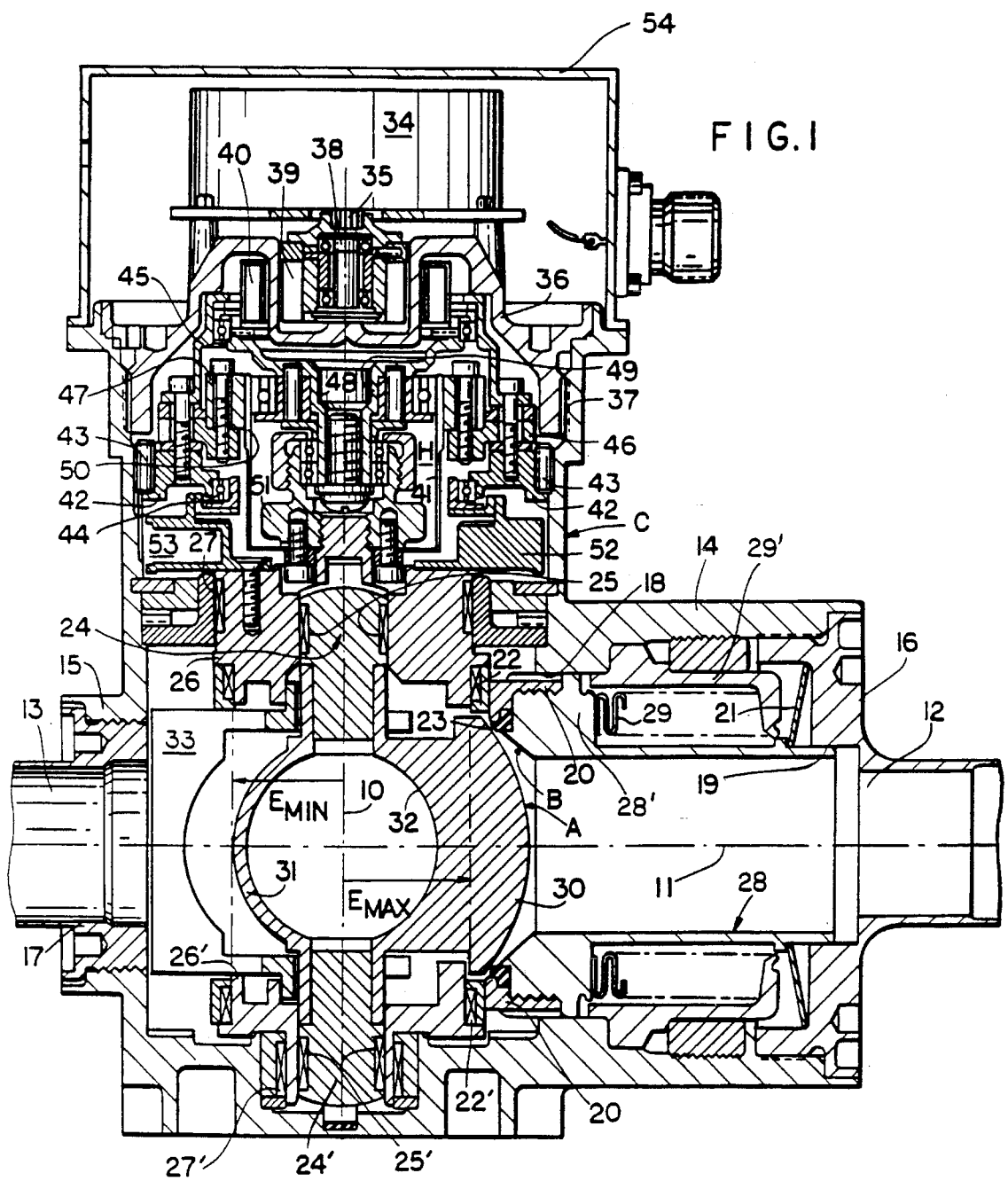
FIG. 1 is a vertical section through a rotary ball valve of the invention, in almost-closed condition, and taken in the plane defined by the axis of inlet-outlet flow and by the rotary axis of valve actuation.

In FIG. 1, the invention is shown in application to a valve having a rotatable spherical valve member A in axial-clearance relation with an annular seat member B, all within a generally tubular body C that is closed at its lower end; even though valve member A is shown as a portion of a sphere, it will be sometimes referred to as a ball. The valve member or ball A is mounted for rotation about a fixed axis 10 which is central to the tubular portion of body C and which intersects and is normal to a transverse axis 11 of fluid flow from an inlet port 12 to an outlet port 13. Local transversely projecting formations 14, 15 of body C are shown fitted with flanged members 16, 17 which respectively define the inlet and outlet ports 12, 13. Flow will be understood to be in either direction between these ports, but for simplified description, the flow controlled by the valve will be referred to as right-to-left, i.e. entry via inlet port 12 and exit via outlet port 13.

It is an important feature of the invention that valve member B shall be axially displaceable with respect to the ball A; therefore, valve member B is shown to be guided, at spaced locations along the flow axis 11, via a cylindrical land 18 of body projection 14 and via a cylindrical counterbore 19 of the flanged inlet-port member 16. Mechanism to govern axial displacement of the annular seat member B will be later supplied, but for present purposes, it will be explained that a cam-follower part 20 of the seat member is shown to be axially loaded, by spring means in the form of a Belleville element 21, to track via needle-bearing means (22) the rise and fall of a rotary cam or eccentric surface, for which maximum rise and fall dimensions are indicated by labels $E_{max.}$ and $E_{min.}$, respectively. And the threaded fit of cam-follower part 20 to annular seat member B will be seen to mount an elastomeric seal ring 23 which must be in compressionally loaded, circumferentially continuous contact with the spherical surface of ball A, in order to complete a sealed closure of the valve; it is perhaps better to describe the material of seal ring 23 as being non-metallic, e.g. an elastomer or a plastic.

It has been indicated that the valve member or ball A is mounted for rotational displaceability about the fixed axis 10. To this end, matched stem or bearing members 24, 24' project from the ball in diametrically opposite directions for coaction with needle-roller bearings 25, 25' in the respective bores of upper and lower cam rings 26, 26'; in turn, the respective cam rings 26, 26' are supported via needle-roller bearings 27, 27' with reference to the valve body C.

The section plane for ball A in FIG. 1 is determined by the intersecting axes 10, 11, and it will be understood that the spherical surface 30 of ball A preferably extends over a spread of angles about the rotary axis, in either or both directions of rotation away from section plane of axes 10, 11, the spread of angles being at least sufficient to enable the valve-seat seal ring 23 to establish a fully sealed stoppage of fluid flow through the valve for the valve-closed condition. Beyond this spread, there is no need for any further spherical surface area and, therefore, the section of FIG. 1 shows a substantial reduction in bulk of valve member A, e.g., a thin somewhat semi-cylindrical shell portion 31, whereby to define a straight cylindrical bore 32 which, in the open condition of the valve has its central axis on the alignment of the inlet/outlet flow axis 11. It will be understood that, having thus reduced the area of the spherical surface 30 to merely what is needed for a fully sealed closure of the valve, a relatively large volume, which otherwise might have been occupied by a more extensive spherical area, has become available at the "backside" of the ball. In FIG. 1, this relatively large volume is readily able to accommodate an arm 33 which rigidly connects the upper cam 26 to the lower cam 26', so that matching cam profiles can impart matching cam-following (20) axial displacements to the annular seat member B, such matching displacements being imparted at diametrically opposite cam-following locations, with respect to the flow axis 11. As thus far described therefore, the ball A has its own freedom for rotation about the fixed axis 10, and the two cams 26, 26' (connected by arm 33) also have their own freedom for rotation about the same fixed axis 10. It will later be explained, in connection with FIGS. 2 to 5, how and that a lost-motion relation between these two independently rotatable structures serves the objects of the invention, when suitable drive torque is applied to the upper cam 26.

In the embodiment of FIG. 1, drive torque is provided by a reversible electric motor 34 having a splined output shaft 35 which is centered on the fixed axis 10. Motor 34, which may be selected from a wide variety of commercially available varieties, is mounted to an end cap 36 which is in threaded engagement at 37 with a counterbore at the upper end of body C, thus effectively closing an interior volume of the valve body and enabling the motor 34 to be mounted and operated externally of and isolated from exposure to fluids controlled by the valve. The end cap 36 is characterized by a central stem 38 within an upwardly open annular cup, for ball-bearing rotary support of the inner driver-magnet component 39 of a magnetic coupling which further comprises an outer driven-magnet component 40 within a downwardly open annular cup formation of the end cap 36; the material of end cap 36 is non-magnetic, suitably stainless steel (e.g. CRES 304), and a cladding of the same material is recommended for each of the magnet components 39, 40.

Within the valve body, a lower bearing retainer 42, keyed at 43 to body C, provides central reference for a ball-bearing 44 for rotational support of the lower end or "cup" 41 of a harmonic-drive unit H, which is the means of high-ratio geared reduction and torque enhancement of the magnetically coupled output of motor 34 to the cam set 26, 26'. The harmonic-drive unit H is shown to be suitably one of the "cup" variety (Type HDC), namely, a commercial product of Harmonic Drive Technologies, Teijin Seiki Boston, Inc., of Peabody, Mass. It suffices here to identify an upper bearing carrier 45 and an intermediate carrier ring 46 bolted to the lower bearing retainer 42; the intermediate carrier ring 46 provides for bolted suspension of the rigid annular (internally toothed) spline member 47 of the harmonic-drive unit, and a drive-shaft coupling member 48 (to which the driven magnet component 40 is pinned) has ball-bearing stabilization within the upper end of the upper bearing carrier 45. The coupling member 48 also has pinned connection to the elliptical-wave generator 49 of the harmonic-drive unit, whereby external teeth of the flexible spline 50 of the harmonic-drive cup 41 are caused to mesh with the rigid teeth of spline member 47 at rotating major-axis regions of the elliptical-wave generator. The closed end of the cup 41 has bolted connection to a so-called driver element 51 and to the upper cam ring 26. For ruggedly centered rotational stability within the harmonic-drive unit, a pair of opposed angular-contact ball bearings is shown to be adjustably loaded by suitable threaded means, thereby stabilizing on axis 10 the high-speed "drive" of coupling 48 with respect to the greatly reduced low-speed high-torque output of driver element 51 to the upper cam ring 26.

The annular seat member B has thus far been only generally indicated, for axial displaceability, pursuant to cam-follower tracking at element 20, against a preloading compliance suggested by the compressionally stressed Belleville washer 21. Seat member B is further described as comprising an elongate tubular body 28, with a radially outward flange portion 28', which is keyed against rotation about axis 11 and to which the cam-follower element has a threaded fit, so as to retain the seal ring 23. The seat member B is further shown to have been preassembled with a sylphon bellows 29, the axially inner end of which is carried by the flange 28 of body 28; the axially outer end of bellows 29 is carried by the radially inward flange of an outer sleeve 29'; by means of which a fixed reference to the valve body C is established upon assembly of the flanged inlet-port member 16 to valve body C. It will be understood that bellows 29 will exhibit inherent axial compliance and that in certain cases the compressional stiffness of bellows compliance may be sufficient alone to provide adequate cam-following action even without the Belleville spring action at 21. It is also to be noted that the described bellows provides a highly desirable pressure-equalizing function, thereby facilitating the described axial displaceability of the annular seat member B in the course of operation between valve-opening and valve-closing conditions.

To complete the structure of FIG. 1, a ring member 52, bolted to the upper cam ring 26, is shown with an angularly localized cavity 53 for a magnetic component having coaction with external means (not shown) whereby to provide a magnetically generated electrical signal indication of the instantaneous angular position of the valve member or ball A. Such a signal will be understood to be used in electronic feedback control of the excitation of motor 34. Also, finally, an inverted cup 54 will be understood to be removably secured over motor 34 and its connection to the drive magnet 39.

Operation of the valve of FIG. 1 will be better understood in the context of the simplified diagrams of FIGS. 2 to 5, which depict an illustrative sequence of valve-opening, commencing in FIG. 2 with the fully closed valve condition, in which annular seat member B is axially loaded by stressed compliant means 21' into peripherally continuous sealed engagement with the spherical surface of the ball A. Earlier discussion has indicated that a lost-motion relation exists between rotation of the cam rings 26 (26'). This lost-motion is schematically shown to be occasioned by a pin 60 carried by the upper cam ring and free of engagement with an arm 61 that forms part of the ball (A) structure; for an assumed valve-opening clockwise rotation of cam 26 in FIG. 2, pin 60 will contact and drive ball A (via arm 61) in rotary clockwise displacement, only after an initial phase of purely cam rotation, i.e., independent of any ball displacement, it being understood that means such as a torsionally stressed spring (not shown, but as described at 88 and at 90, 90' in FIG. 10) normally urges the ball to its closed position, namely, with arm 61 retained against a stop formation 62 in the valve housing C. Alternatively, in place of or in addition to such a torsionally stressed spring, the pin 60 may be a permanent-magnet element, with a degree of magnetically retained engagement to arm 61 with such time, in the return of the valve to its closed condition, as arm 61 is intercepted by stop formation 62, and cam rings 26 (26') are further driven back to the valve-seat closed and sealed position, later to be identified at 66' in FIG. 5.

In the diagrams of FIGS. 2 and 3, cam 26 is shown to have a circular profile which is eccentric (to the greatly exaggerated extent E) with respect to the fixed axis 10 of rotation of both ball A and cam ring 26; and the cam-follower means 20 for seat-member tracking of the cam (26) profile is shown in FIG. 2, to be at the low point of the utilized range of profile displacement, for an assumed 90 degrees of cam (26) rotation to arrive at the full-open condition shown in FIG. 3. In the course of this rotation, the orientation of the transverse bore 32 of ball A is angularly displaced through an acute angle, while the cam-following (20) displacement of the annular seat member B has undergone an axial displacement δ.

More specifically, FIG. 4 depicts the sinusoidal course of cam-following displacement to be expected for tracking a circular cam profile of gyrated eccentricity E. In dashed outline 63, a full half cycle is shown; but it is also shown in solid outline 64 that it is preferred to generate cam-following action over a 90-degree range which straddles an inflection point of the sinusoid. This preferred range is indicated by legend to be the substantially linear portion of the eccentrically gyrated profile, with inflection at the half-way point (45°) in the 90° range. In FIG. 5, for simplification, this substantially linear portion is drawn as a linear course 65 wherein, for illustrative purposes only, certain sequential events take place in the first 25° of cam (26) rotation, and wherein numerical indications of seat displacement can be taken to be in millimeters, or in other units, as appropriate to the dimensional scale of the valve.

As indicated above, a valve-opening operation of cam (26) rotation illustratively begins about 25 degrees prior to pin (60) pick-up of ball arm 61, and it is indicated by legend that there is a clearance between cam 26 and cam follower 20. Thus, a first increment $\alpha_1$ of cam (26) rotation is devoted to take-up of this clearance. The next increment $\alpha_2$ of cam (26) rotation is concerned with take-up of mechanical play (including compliant compression of the sealed seat-to-ball engagement). And the third increment of cam (26) rotation is concerned with axially displacing seat member B into clearance relation with ball A. If, as shown, these preliminary factors must be accounted for within the first 25 degrees of cam (26) rotation, then 65 degrees remain for rotary ball displacement, free of seat engagement, to the depicted full-open condition of FIG. 3, at which point, excitation of motor 34 may terminate automatically, as when arm 61 trips a control switch, symbolized at 66 in FIG. 3.

On the return "stroke" of cam (26) rotation, i.e. from the fully-open to the fully-closed condition of the valve, motor 34 is driven in the reverse direction, with ball arm 61 continuously torsionally biased and/or magnetically but detachably engaged to track the reversed displacement of cam pin 60, until arm 61 re-engages stop 62, with ball passage 32 oriented at the acute angle (off axis 11) shown in FIG. 2. From this point and until the full 90 degrees of cam (26) rotation have been completed, cam/cam-follower coaction establishes the clearance and preloaded-seal events noted above in connection with the symbols $\alpha_2$, $\alpha_3$. A heavy arrow 66' at the zero-degrees position in FIG. 5 will be understood to indicate that a control switch coaction between cam 26 and body C is operative to shut down the excitation of motor 34 upon valve-closing return of cam 26 to this zero-degree condition.

Figure 6:
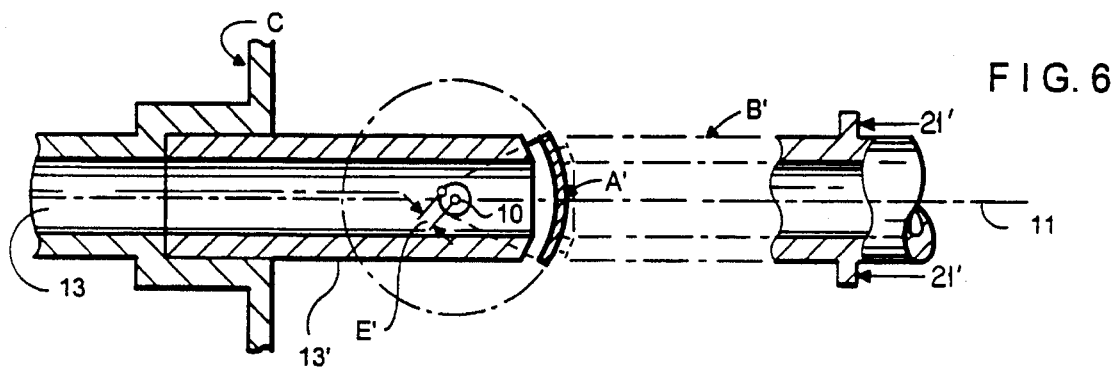
FIG. 6 is a simplified sectional view of coacting valve parts, for a second embodiment of the invention, in valve-closed condition.
Figure 7:
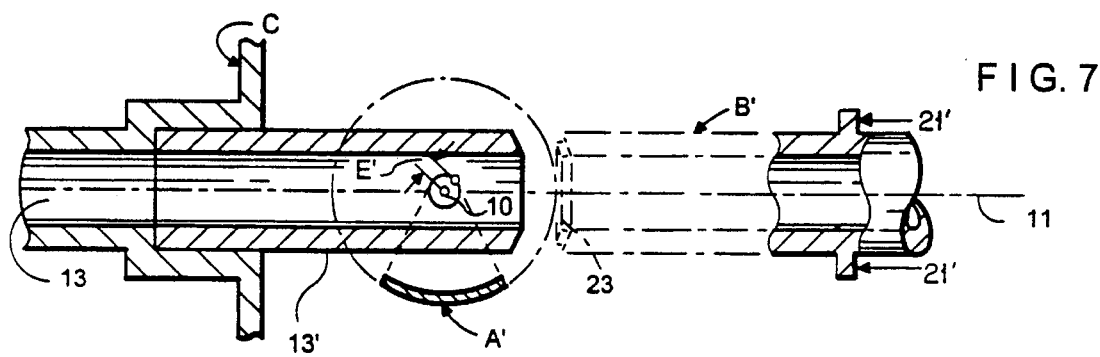
FIG. 7 is a view of the valve parts of FIG. 6, for the valve-open condition.

The simplified diagrams of FIGS. 6 and 7, respectively depict "closed" and "open" conditions of a modified valve wherein the ball A' is but a limited sector of a "hollow" sphere or spherical shell, again mounted to be rotatable about the fixed axis 10, and wherein drive to a cam 26 is responsible for correctly phased clearance of the annular seat member B' from ball A' to permits if desired, a full 90° of ball A' rotation, all in the manner described in detail for the valve-member (a) and valve-seat (b) operation of FIGS. 1 to 5. The point of difference in FIGS. 6 and 7 is that, for greater efficiency of fluid flow between inlet and outlet ports, the outlet 13 is shown additionally to comprise a fixed tubular extension 13', projecting inwardly into the volume of the geometric sphere of "ball" A' but without interference with ball-A' displacement. Even though cam 26 is not shown in FIGS. 6 and 7, it will be understood to have been suggested by the designation of its eccentricity E', which accounts, again with exaggeration, for the clearance of the seat seal 23 with respect to the locus or path of spherical displacement of ball A', throughout the course of rotary-ball displacement.

Figure 8:
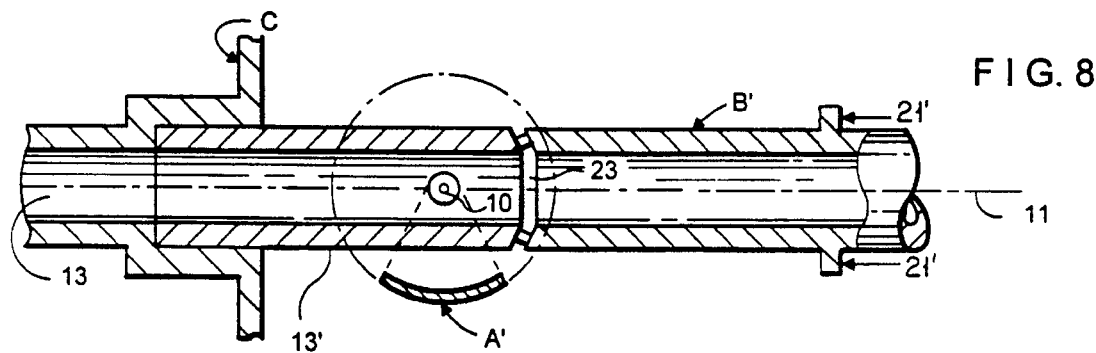
FIG. 8 is a view similar to FIG. 7, for the fully open condition of a further-modified valve.
Figure 9:
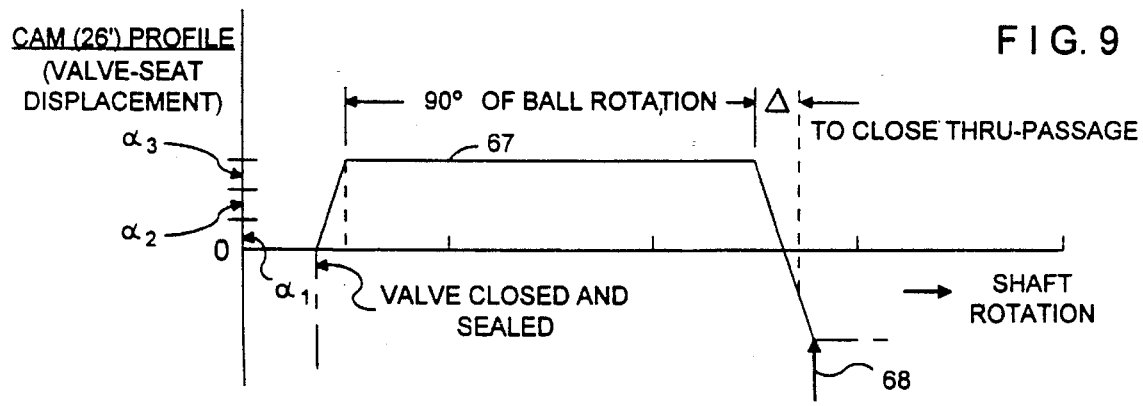
FIG. 9 is a graphical representation of a cam profile for the modified valve of FIG. 8.

The embodiment of FIGS. 8 and 9 represents modification of the embodiment of FIGS. 6 and 7, and therefore the same reference designations are used, as appropriate. The point of difference in FIGS. 8 and 9 is that the cam profile of FIG. 9, for assured clearance of the annular seat member B' with respect to ball A', is non-circular but is characterized by a land or rise 67 to maintain the clearance $\alpha_3$ throughout all 90 degrees of rotation of "ball" A', should that much ball rotation be necessary. At completion of ball rotation, the shut-off switching means 66 of FIG. 3 will have been omitted, thus enabling further cam rotation A to a point symbolized at 68 in FIG. 9, which has allowed the annular seat member B' to respond to axial preload by means 21 and/or 29, thereby effecting axial displacement of seat member B' into minimum pressure-drop relation to the outlet-tube projection 13'. The heavy arrow at 68 in FIG. 9 will be understood to indicate a switching operation to shut down the excitation of motor 34 upon achievement of suitably sealed coupling of seat member B' to the outlet tube 13'

The embodiment of FIG. 10 is illustrative of the use of a brushless d-c servo motor as the driver for rotation of a ball-valve member A' about axis 10, in generally the configuration schematically depicted and described in connection with FIGS. 6 and 7. Thus, the valve member A' will be understood to be a limited sector of a spherical shell 70, journalled for anti-friction rotation in upper and lower bearings 25, 25', coaxially within the upper and lower cams 26, 26' which impart axial displacement to the valve-seat member B'. The connecting member 33 which ties the upper and lower cams to each other is not shown in FIG. 10 but will be understood to be out of the plane of the drawing of FIG. 10. And, as also depicted in FIGS. 6 and 7, an elongate tubular extension 13' of the outlet 13 projects inwardly of the valve, on axis 11 and past the point of intersection with the rotary axis 10, into close clearance relation with the concave spherical back surface of the shell of the ball valve member A'. In the near-closed position shown in FIG. 10, the cam-connecting member (33) will be understood to be in approach to its maximum angular offset (e.g. 25 degrees or less) from abutment with shell 70; and for the full-open condition (e.g. as in FIG. 7), the cam-connecting member (33) will be in abutment with shell 70 (as for the case of pin 60 abutment with ball arm 61 in FIG. 3). Thus, it will be understood that ample freedom exists within the chamber 72 of the valve to permit the described rotations, relative displacements and angular lost motion, for the illustrative example of full 90-degree cam (26, 26') displacement and 65-degree displacement of the valve member A' and of the valve seat member B' between their full-open and full-closed positions.

As noted above, the drive motor in FIG. 10 is a brushless d-c servo motor, brushless being indicated to avoid reliance on mechanical brushes sliding on a commutator; instead, multiple windings in the stator are commutated by semiconductor power switches. Suitable brushless motors of the character indicated are commercially available from a plurality of sources, including Sierracin/Magnedyne of Carlsbad, Calif., and Magnetic Technology Division of Vernitron Corporation, Canoga Park, Calif., so that extensive description is not needed for present purposes. Suffice it to say that the motor of FIG. 10 preferably employs three winding phases, in a 12-pole configuration. Furthermore, reference is made to said U.S. patents for a generalized operation of such a motor in a ball-valve rotation context wherein the range of driven rotation was 180 degrees. Principles remain the same for present driven rotation requirement, which in the illustrative case of FIG. 10 is 90 degrees; or which, if applied to the sealed continuous flow-through embodiment of FIGS. 8 and 9, will be in the order of 120 degrees.

It suffices here to identify in FIG. 10, component parts of the brushless motor, for controlled rotation of its drive shaft 74, which is shown fixed to the cam rings 26, 26'. The stator of the motor comprises windings 75 and a stack 76 of laminations; electrical leads, as at 77, to the windings are supplied via a standard multiple-pin external-connection fitting 78. The stator components are sealed inside an annular space defined by and between the housing C' and a housing base member 79 and its skirt 80; such sealed confinement forecloses stator components from exposure to effluent-gas and ambient environments. The rotor 81, including shaft 74, consists of a core 82, back-up iron 83, and permanent magnets 84, retained by annular end pieces 85 which, with an outer cylindrical cladding or shell 86, complete the sealed containment and protection of the magnets 84 from effluent-gas exposure. The thus-sealed stator and rotor assemblies provide a so-called "wetted construction", allowing effluent to enter and pressurize the rotor cavity of the motor. And since it is not necessary to seal the motor drive shaft 74, no dynamic seals need be used at any of the sites of rotary-bearing support.

For fail-safe purposes, a wound and tensed clock spring 88 is secured at its inner end to shaft 74, with outer-end anchorage by bolt 89 to the flanged base member 79. In similar fashion and to angularly bias the angular lost-motion connection (namely, via pin 60 to arm 61, FIG. 2; or via cam-connecting arm 33 to ball A or A'), further upper and lower clock springs 90, 90' are shown for reaction between ball A' and the respective upper and lower cams 26, 26'. The direction of torsional bias by spring 88 assures preload of shaft 74 in the angular direction of "failing safe" to a closed and sealed condition of the valve. Similarly, the direction of torsional bias by the springs 90, 90' assures that the ball arm (61) will track pin 60 of cam 26 at all times except when cams 26, 26' retract after the ball arm 61 abuts its limit stop 62 (FIG. 3), this further retraction accounting for the successive increments $\alpha_3$, $\alpha_2$, $\alpha_1$ of seat member B(B') contact and seal coaction with the ball A(A').

The described embodiments of the invention will be seen to meet all stated objects with superior valve action, which minimizes wear and friction and which is effective whatever the dimensional requirements of a flow-control situation. And it will be understood that certain details provided schematically or otherwise in connection with a given diagram are equally usable in connection with configurations of other diagrams. For example, the discussion of bias springs in FIG. 10 is applicable to the valve of FIG. 1, even though such springs do not happen to be shown in FIG. 1.

What is claimed is:

1. A rotary-ball and poppet-action valve comprising:

(a) a valve body having inlet and outlet ports on a first axis of fluid flow;

(b) a spherical ball-valve member interposed between said ports and supported by said body for rotary displaceability about a body-fixed axis that is on a diameter of the geometric sphere of said valve member, wherein said fixed axis and said first axis intersect at the center of said geometric sphere;

(c) said spherical ball-valve member being a shell which is a truncated portion of a sphere and having inner and outer spherical surfaces, one of said ports having a cylindrical bore extending axially within said geometric sphere and into axially adjacent clearance relation with said inner surface, the other of said ports having a cylindrical bore extending axially outside said geometric sphere and into axially adjacent clearance relation with said outer surface, the truncated portion of said sphere being of such angular extent about the body-fixed axis as to span both of said bores when in the valve-closing position of said shell;

(d) one of said ports, including an annular valve-seat member defining the cylindrical bore of said one port and guided for axial displaceability in and out of shell-engaging closure of the adjacent one of said axially adjacent clearances; and (e) actuating means for axially displacing said annular valve-seat member in coordination with rotation of said ball such that said seat member is in circumferentially continuous engagement with said shell only when said shell is in its valve-closing angular position.

2. The valve of claim 1, wherein said axes are orthogonally related.

3. The valve of claim 1, wherein the angular extent of said truncated portion is limited to substantially only span said annular valve-seat member when in the valve-closing position of said shell.

4. The valve of claim 1, in which said annular valve-seat member is guided for axial displaceability in and out of engagement with the outer spherical surface of said shell.

5. The valve of claim 4, in which the bore of said one of said ports is defined by a tubular extension thereof inward of the geometric sphere of said ball-valve member.

6. A rotary-ball and poppet-action valve comprising:

(a) a valve body having inlet and outlet ports on a first axis of fluid flow;

(b) a spherical ball-valve member interposed between said ports and supported by said body for rotary displaceability about a body-fixed axis that is on a diameter of the geometric sphere of said valve member, wherein said fixed axis and said first axis intersect at the center of said geometric sphere;

(c) said spherical ball-valve member being a shell which is a truncated portion of a sphere and having inner and outer spherical surfaces, wherein the truncated portion is of such angular extent about the body-fixed axis as to span one of said ports when in the valve-closing position of said shell;

(d) an annular valve-seat member connected to said one port and guided for axial displaceability on said first axis, said shell being in clearance relation with a geometric axial projection of said annular valve member when in a valve-open position of said shell; and (e) actuating means for axially displacing said annular valve-seat member in coordination with rotation of said shell such that said seat member is in engagement with the other of said ports only when said shell is in its valve-open angular position, and such that said seat member is in engagement with said shell only when said shell is in its valve-closing angular position.

7. The valve of claim 6, in which the other of said ports is characterized by a tubular extension thereof inward of the geometric sphere of said shell, and in which said seat member is engaged to said tubular extension when said shell is in its valve-open angular position.

\* \* \* \* \*

UNITED STATES PATENT AND TRADEMARK OFFICE
CERTIFICATE OF CORRECTION

| | |
|---|---|
| PATENT NO. : | 5,611,516 |
| DATED : | March 18, 1997 |
| INVENTOR(S) : | Robert H. REINICKE, Joseph M. CARDIN and Arnold DALENE |

It is certified that error appears in the above-indentified patent and that said Letters Patent is hereby corrected as shown below:

Column 6, line 59;  insert --$\alpha_3$-- after "third increment"

Column 7, line 10;  after "symbols" and before "$\alpha_2$, $\alpha_3$." insert --$\alpha_1$,--

Column 7, line 23;  change "permits" to --permit,--

Column 7, line 48;  after "cam rotation" change "A" to --$\Delta$--

Signed and Sealed this

Twenty-sixth Day of August, 1997

Attest:

BRUCE LEHMAN

Attesting Officer   Commissioner of Patents and Trademarks